(12) United States Patent
Ozeki

(10) Patent No.: US 11,583,968 B2
(45) Date of Patent: Feb. 21, 2023

(54) MACHINE LEARNING DEVICE, PREDICTION DEVICE, AND CONTROLLER

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 426 days.

(21) Appl. No.: 16/839,395

(22) Filed: Apr. 3, 2020

(65) Prior Publication Data
US 2020/0338677 A1    Oct. 29, 2020

(30) Foreign Application Priority Data

Apr. 23, 2019 (JP) .............................. JP2019-081832

(51) Int. Cl.
G06N 20/00    (2019.01)
B23Q 11/10    (2006.01)
G06N 5/046    (2023.01)

(52) U.S. Cl.
CPC ............. *B23Q 11/10* (2013.01); *G06N 5/046* (2013.01); *G06N 20/00* (2019.01)

(58) Field of Classification Search
CPC ........ G06N 20/00; G06N 5/046; G06N 3/088; G05B 19/408; G05B 19/406; G05B 23/024; G05B 2219/33321; G05B 2219/49049; G05B 2219/49215; B23B 2231/24; B23B 2250/12; B23Q 11/10
See application file for complete search history.

(56) References Cited

U.S. PATENT DOCUMENTS

| | | | |
|---|---|---|---|
| 2014/0271002 A1 | 9/2014 | Hoshino | |
| 2017/0031329 A1* | 2/2017 | Inagaki | ................ B25J 9/1674 |
| 2017/0139432 A1* | 5/2017 | Endou | ..................... B23Q 11/10 |
| 2017/0270434 A1* | 9/2017 | Takigawa | ............... B23K 26/38 |
| 2017/0357243 A1* | 12/2017 | Takayama | ............... G06N 3/08 |
| 2018/0067471 A1* | 3/2018 | Saitou | ............. G05B 19/40932 |
| 2018/0267489 A1* | 9/2018 | Tango | .................. G05B 19/406 |
| 2018/0307203 A1* | 10/2018 | Aizawa | .............. G05B 19/4065 |

(Continued)

FOREIGN PATENT DOCUMENTS

| | | |
|---|---|---|
| JP | 7-75937 | 3/1995 |
| JP | 2566345 | 12/1996 |
| JP | 2001-219338 | 8/2001 |

(Continued)

*Primary Examiner* — Dave Misir
(74) *Attorney, Agent, or Firm* — Wenderoth, Lind & Ponack, L.L.P.

(57) ABSTRACT

The state of a cutting fluid after machining is predicted. A machine learning device includes: an input data acquisition unit that acquires input data including arbitrary machining conditions for an arbitrary work in machining by an arbitrary machine tool and state information indicating a state of a cutting fluid before machining is performed under the machining conditions; a label acquisition unit that acquires label data indicating state information of the cutting fluid after the machining is performed under the machining conditions included in the input data; and a learning unit that executes supervised learning using the input data acquired by the input data acquisition unit and the label data acquired by the label acquisition unit to generate a learned model.

12 Claims, 7 Drawing Sheets

(56) References Cited

U.S. PATENT DOCUMENTS

2018/0314242 A1* 11/2018 Hirose ............. G05B 19/41885
2018/0373233 A1* 12/2018 Goto .................. G05B 19/4065

FOREIGN PATENT DOCUMENTS

| JP | 2014-176942 | 9/2014 |
| JP | 2017-42882 | 3/2017 |
| JP | 2017-68563 | 4/2017 |
| JP | 2017-87403 | 5/2017 |
| JP | 2017-164801 | 9/2017 |
| JP | 2018-24080 | 2/2018 |
| JP | 2018-69408 | 5/2018 |
| JP | 2018-97494 | 6/2018 |
| JP | 2018-106379 | 7/2018 |
| JP | 2018-124929 | 8/2018 |
| JP | 2018-153872 | 10/2018 |
| JP | 2018-181216 | 11/2018 |
| JP | 2018-202538 | 12/2018 |
| JP | 2019-8675 | 1/2019 |

* cited by examiner

MACHINE LEARNING DEVICE, PREDICTION DEVICE, AND CONTROLLER

This application is based on and claims the benefit of priority from Japanese Patent Application No. 2019-081832, filed on 23 Apr. 2019, the content of which is incorporated herein by reference.

BACKGROUND OF THE INVENTION

Field of the Invention

The present invention relates to a machine learning device, a prediction device, and a controller.

Related Art

In a machine tool that processes a work using a tool, the work is processed by discharging a cutting fluid from a cutting fluid discharge port. In a work cutting process, the role of a cutting fluid is important. The cutting fluid has a role of cooling a tool and a work and providing lubrication during machining and washing away chips generated during machining by being discharged from the cutting fluid discharge port.

The cutting fluid is supplied from a tank to a machine tool and discharged toward a work or the surroundings thereof. After that, the cutting fluid is returned to the tank and is supplied to the machine tool again. Therefore, a filter or the like is used for removing chips and the like included in the cutting fluid. However, since the filter or the like cannot completely remove chips or the like, the cutting fluid is gradually contaminated as it is used. Since the contamination of the cutting fluid leads to a decrease in machining quality of the machine tool, the cutting fluid is replaced entirely at a predetermined timing.

Therefore, a technology in which a pressure sensor is arranged in a pipe of a cutting fluid and the timing to replace the cutting fluid is informed when the impact pressure resulting from the chips included in the cutting fluid measured by the pressure sensor reaches a predetermined impact pressure is known. Alternatively, a technology in which a correlation between an impurity level of a cutting fluid due to chips or the like and detection information such as a temperature and a hydraulic pressure of the cutting fluid is machine-learned, and as impurity level of a cutting fluid corresponding to new detection information received from a machine tool is detected by referring to the correlation, is known. For example, see Patent Documents 1 and 2.

Patent Document 1: Japanese Unexamined Patent Application, Publication No. 2001-219338

Patent Document 2: Japanese Unexamined Patent Application, Publication No. 2018-97494

SUMMARY OF THE INVENTION

The causes of contamination of the cutting fluid are not limited to chips or the like of a work and may include a change in a concentration or a pH value of the cutting fluid, mixing of an operating oil or the like of a machine, and odor due to the generation of microorganisms such as bacteria. The concentration and pH value of the cutting fluid and odor due to the generation of microorganisms can be dealt with through maintenance such as adding water, disinfectants, or the like rather than replacing the cutting fluid.

However, the determination of whether the cutting fluid will be subjected to maintenance or replaced entirely and the determination of the timing thereof require a corresponding amount of experience in an operator, which is a heavy burden for the operator.

Therefore, it is desirable to predict the state (for example, a concentration, a pH value, an odor level, and the like) of a cutting fluid after machining.

(1) An aspect of a machine learning device according to the present disclosure includes: an input data acquisition unit that acquires input data including arbitrary machining conditions for an arbitrary work in the machining of an arbitrary machine tool and state information indicating a state of a cutting fluid before machining is performed under the machining conditions; a label acquisition unit that acquires label data indicating state information of the cutting fluid after the machining is performed under the machining conditions included in the input data; and a learning unit that executes supervised learning using the input data acquired by the input data acquisition unit and the label data acquired by the label acquisition unit, and generates a learned model.

(2) An aspect of a prediction device according to the present disclosure includes: the learned model generated by the machine learning device according to (1); an input unit that inputs machining conditions to be performed from now on with respect to a machining target work and present state information of a cutting fluid prior to machining by the machine tool; a prediction unit that inputs the machining conditions to be performed from now on and the present state information input by the input unit to the learned model and predicts state information of the cutting fluid after machining is performed under the machining conditions to be performed from now on.

(3) An aspect of a prediction device according to the present disclosure includes the machine learning device according to (1).

(4) An aspect of a controller according to the present disclosure includes a prediction device according to (2) or (3).

According to an embodiment, it is possible to predict the state of a cutting fluid after machining.

DETAILED DESCRIPTION OF THE INVENTION

Hereinafter, an embodiment of the present disclosure will be described with reference to the drawings.

Embodiment

Figure 1:
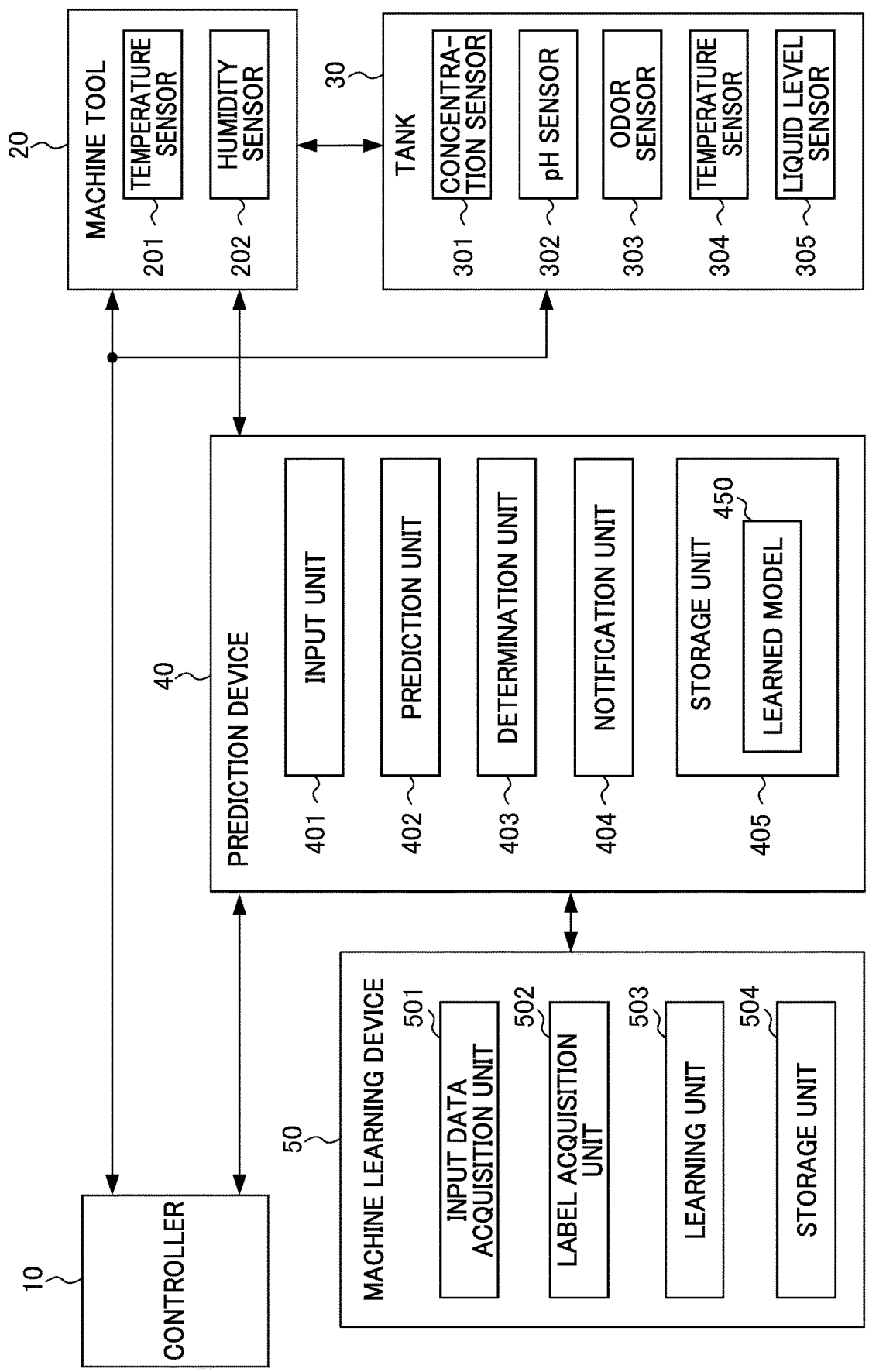
FIG. 1 is a functional block diagram illustrating a functional configuration example of a numerical control system according to an embodiment.

FIG. 1 is a functional block diagram illustrating a functional configuration example of a numerical control system according to an embodiment. As illustrated in FIG. 1, the numerical control system includes a controller 10, a machine tool 20, a tank 30, a prediction device 40, and a machine learning device 50.

The controller 10, the machine tool 20, the prediction device 40, and the machine learning device 50 may be connected directly to each other via a connection interface (not illustrated). Moreover, the controller 10, the machine tool 20, the prediction device 40, and the machine learning device 50 may be connected to each other via a network (not illustrated) such as a local area network (LAN) or the Internet. In this case, the controller 10, the machine tool 20, the prediction device 40, and the machine learning device 50 have a communication unit (not illustrated) for performing communication with each other via the connections. As will be described later, the controller 10 may include the prediction device 40 and the machine learning device 50. Moreover, the machine tool 20 may include the controller 10.

The controller 10 and the tank 30 may be connected directly to each other via a connection interface (not illustrated) or may be connected to each other via a network (not illustrated). Moreover, the machine tool 20 and the tank 30 may be connected by a pipe or a hose to which a cutting fluid is supplied.

The controller 10 is a numerical controller which is well known to those skilled in the art. The controller 10 generates an operation command on the basis of control information and transmits the generated operation command to the machine tool 20 and the tank 30. In this way, the controller 10 controls the operation of the machine tool 20 and drives a pump (not illustrated) disposed in the tank 30 so that a cutting fluid circulates between the machine tool 20 and the tank 30. Moreover, the controller 10 may output the control information to the prediction device 40. The control information includes a machining program and the values of parameters set to the controller 10.

Moreover, as will be described later, the controller 10 may acquire from the machine tool 20 temperature data of a surrounding environment temperature and humidity data of a surrounding environment humidity measured at the machine tool 20. Moreover, the controller 10 may acquire from the tank 30 state information indicating the state of a cutting fluid measured in the tank 30. The controller 10 may output the acquired temperature data, humidity data, and cutting fluid state information to the prediction device 40.

The machine tool 20 is a processing machine that operates on the basis of the operation command of the controller 10. The machine tool 20 may include a temperature sensor 201 that measures a surrounding environment temperature of the machine tool 20 and a humidity sensor 202 that measures a surrounding environment humidity. The machine tool 20 may output information indicating an operation state based on the operation command of the controller 10, the temperature data of the surrounding environment temperature, and the humidity data of the surrounding environment humidity to the controller 10.

The sampling periods of the temperature sensor 201 and the humidity sensor 202 may be set appropriately according to the prediction accuracy required for the prediction device 40 to be described later, for example.

The tank 30 is a tank that stores a cutting fluid to be used by the machine tool 20. The tank 30 may include a concentration sensor 301, a pH sensor 302, an odor sensor 303, a temperature sensor 304, and a liquid level sensor 305.

The concentration sensor 301 measures a concentration of a cutting fluid. The concentration of the cutting fluid is in the range from "0%" to "100%".

The pH sensor 302 measures a pH value of a cutting fluid. The pH value of the cutting fluid is "0" or more.

The odor sensor 303 measures an odor level of a cutting fluid. The odor of the cutting fluid mainly results from decay caused by microorganisms such as bacteria generated in the cutting fluid and the occurrence of mold. Here, the odor level is "260" for "hot coffee" and is in the range from "210" to "270" for "machine oil", for example. Moreover, the odor level is in the range from "150" to "1300" in an odor generation source of a fiber-reinforced plastics (FRB) plant or at the boundary thereof, for example.

The temperature sensor 304 measures a control temperature of the cutting fluid in a tank.

The liquid level sensor 305 measures a liquid level of a cutting fluid in a tank.

The sampling periods of the concentration sensor 301, the pH sensor 302, the odor sensor 303, the temperature sensor 304, and the liquid level sensor 305 may be set appropriately according to the prediction accuracy required for the prediction device 40 to be described later, for example, similarly to the temperature sensor 201 and the humidity sensor 202.

The tank 30 outputs the measured concentration, pH value, odor level, control temperature, and liquid level of the cutting fluid to the controller 10.

In an operation phase, the prediction device 40 may acquire the machining conditions to be performed from now on with respect to a machining target work included in the control information from the controller 10 prior to machining by the machine tool 20. Moreover, the prediction device 40 may acquire the present state information of the cutting fluid in the tank 30 from the controller 10. The prediction device 40 can predict state information of the cutting fluid after machining by inputting the acquired machining conditions to be performed from now on and the present state information of the cutting fluid to a learned model provided from the machine learning device 50 to be described later. The state information includes a concentration, a pH value, and an odor level of a cutting fluid as will be described later. Moreover, the state information may include a control temperature or the like of the cutting fluid together with the concentration, the pH value, and the odor level of the cutting fluid.

Before describing the prediction device 40, machine learning for generating the learned model will be described.

Machine Learning Device 50

The machine learning device 50 acquires, in advance, arbitrary machining conditions for an arbitrary work in a cutting process of an arbitrary machine tool and state information including at least a concentration, a pH value, and an odor level of a cutting fluid before machining is performed under the machining conditions as input data.

Moreover, the machine learning device 50 acquires data including the concentration, the pH value, and the odor level of the cutting fluid after machining is performed under the machining conditions in the acquired input data as a label (a correct answer).

The machine learning device 50 performs supervised learning using training data, which is a set of the label and the acquired input data and constructs a learned model to be described later.

By doing so, the machine learning device 50 can provide the constructed learned model to the prediction device 40. The machine learning device 50 will be described in detail.

As illustrated in FIG. 1, the machine learning device 50 includes an input data acquisition unit 501, a label acquisition unit 502, a learning unit 503, and a storage unit 504.

In a learning phase, the input data acquisition unit 501 acquires machining conditions for an arbitrary cutting target work and state information including at least the concentration, the pH value, and the odor level of the cutting fluid before machining is performed under the machining conditions from the controller 10 or the like as the input data via a communication unit (not illustrated). The input data acquisition unit 501 outputs the acquired input data to the storage unit 504.

The label acquisition unit 502 acquires data indicating the concentration, the pH value, and the odor level of the cutting fluid after machining is performed under the machining conditions in the input data as label data (correct answer data) and outputs the acquired label data to the storage unit 504.

The learning unit 503 receives a set of the input data and the label as training data and performs supervised learning using the received training data to thereby construct a learned model 450 that predicts the concentration, the pH value, and the odor level of the cutting fluid after machining on the basis of the machining conditions to be performed from now on for the machining target work and the present state information of the concentration, the pH value, and the odor level of the cutting fluid.

The learning unit 503 provides the constructed learned model 450 to the prediction device 40.

Here, it is preferable to prepare a number of pieces of training data for performing supervised learning. For example, the training data may be acquired from the controllers 10 in various places where it is actually operating in the plants of customers.

Figure 2:
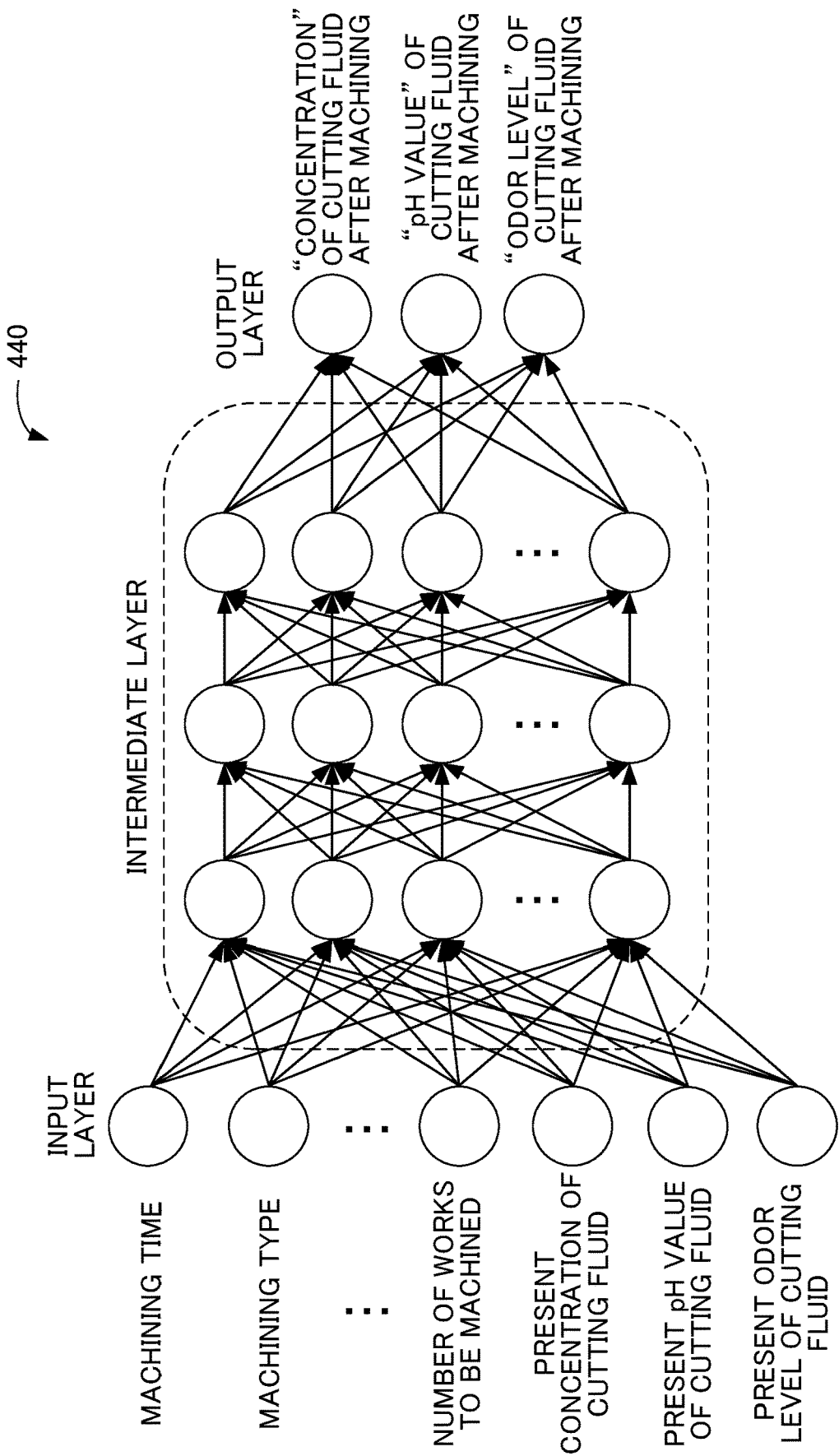
FIG. 2 is a diagram illustrating an example of a learned model provided to a prediction device illustrated in FIG. 1.

FIG. 2 is a diagram illustrating an example of the learned model 450 provided to the prediction device 40 illustrated in FIG. 1. In this example, as illustrated in FIG. 2, the learned model 450 exemplifies a multi-layer neural network in which machining conditions to be performed from now on such as a machining time or machining type corresponding to a machining target work and the present state information of the concentration, the pH value, and the odor level of the cutting fluid are used as an input layer and data indicating "concentration", "pH value", and "odor level" of the cutting fluid after machining is performed under the machining conditions is used as an output layer.

Here, the machining conditions to be performed from now on include a machining time, a machining type (drilling, slicing, or the like), the size of a work, the number of works to be machined, the material (metal such as stainless steel or alloy steel and non-metal such as ceramics), and a tool type corresponding to a machining target work. Moreover, the machining conditions to be performed from now on may include a present surrounding environment temperature measured by the temperature sensor 201, the present surrounding environment humidity measured by the humidity sensor 202, the present control temperature in the tank 30 measured by the temperature sensor 304, the present liquid level in the tank 30 measured by the liquid level sensor 305, and the time elapsed since the previous replacement of cutting fluid.

The size of the work can be acquired by a machining path analyzed on the basis of a computer-aided design (CAD) drawing, an NC program, or the like input to the controller 10.

When new training data is acquired after the learned model 450 is constructed, the learning unit 503 may perform supervised learning additionally for the learned model 450 to update the learned model 450 already constructed.

The supervised learning may be performed by online learning. Moreover, the supervised learning may be performed by batch learning. Furthermore, the supervised learning may be performed by mini-batch learning.

Online learning is a learning method in which supervised learning is performed whenever machining is performed by the machine tool 20 and training data is created. Moreover, batch learning is a learning method in which a plurality of pieces of training data are collected while machining is performed by the machine tool 20 repeatedly and training data is created repeatedly and supervised learning is performed using all pieces of collected training data. Furthermore, mini-batch learning is a learning method that is intermediate between online learning and batch learning in which supervised learning is performed whenever a certain amount of training data is collected.

The storage unit 504 is a random access memory (RAM) or the like and stores the input data acquired by the input data acquisition unit 501, the label data acquired by the label acquisition unit 502, and the learned model 450 constructed by the learning unit 503.

Hereinabove, machine learning for generating the learned model 450 included is the prediction device 40 has been described.

Next, the prediction device 40 in an operation phase will be described.

Prediction Device 40 in Operation Phase

As illustrated in FIG. 1, the prediction device 40 in an operation phase includes an input unit 401, a prediction unit 402, a determination unit 403, a notification unit 404, and a storage unit 405.

The prediction device 40 includes an arithmetic processing unit (not illustrated) such as a central processing unit (CPU) in order to realize the operation of the functional blocks illustrated in FIG. 1. Moreover, the prediction device 40 includes an auxiliary storage device (not illustrated) such as a read only memory (ROM) or an HDD storing various control programs and/or a main storage device (not illustrated) such as a RAM for storing data required temporarily for the arithmetic processing unit to execute programs.

In the prediction device 40, the arithmetic processing device reads an OS or application software from the auxiliary storage device and develops the read OS and application software in the main storage device to perform arithmetic processing on the basis of the read OS or application software. The prediction device 40 controls hardware components on the basis of the arithmetic processing result. In this way, the processes of the functional blocks illustrated in FIG. 1 are realized. That is, the prediction device 40 can be realized by the cooperation of hardware and software.

The input unit 401 inputs the machining conditions to be performed from now on with respect to the machining target work related to the machining and the present state information of the concentration, the pH value, and the odor level of the cutting fluid from the control information of the controller 10, for example, prior to machining by the machine tool 20. The input unit 401 outputs the machining conditions to be performed from now on and the present state information of the cutting fluid to the prediction unit 402.

The prediction unit 402 inputs the machining conditions to be performed from now on and the present state information of the cutting fluid to the learned model 450 illustrated in FIG. 2 and predicts the state information of "concentration", "pH value", and "odor level" of the cutting fluid after machining.

The determination unit 403 determines whether the cutting fluid is to be subjected to maintenance or be entirely replaced on the basis of the state information of the concentration, the pH value, and the odor level of the cutting fluid after machining predicted by the prediction unit 402.

More specifically, the determination unit 403 determines an optimal timing to perform maintenance on the cutting fluid on the basis of a comparison between predicted values of the concentration, the pH value, and the odor level of the cutting fluid and the thresholds.

Moreover, the determination unit 403 may calculate an evaluation value to be described later using the predicted values of the concentration, the pH value, and the odor level of the cutting fluid and determine an optimal timing to replace the cutting fluid entirely instead of performing maintenance on the basis of the calculated evaluation value.

The notification unit 404 can recommend an optimal timing to perform maintenance on the cutting fluid or an optimal timing to replace the cutting fluid entirely to users. The notification unit 404 may notify the same to an output device (not illustrated) such as a liquid crystal display included in the controller 10 and/or the machine tool 20. Moreover, the notification unit 404 may notify the same via sound using a speaker (not illustrated).

Maintenance of Concentration

Figure 3:
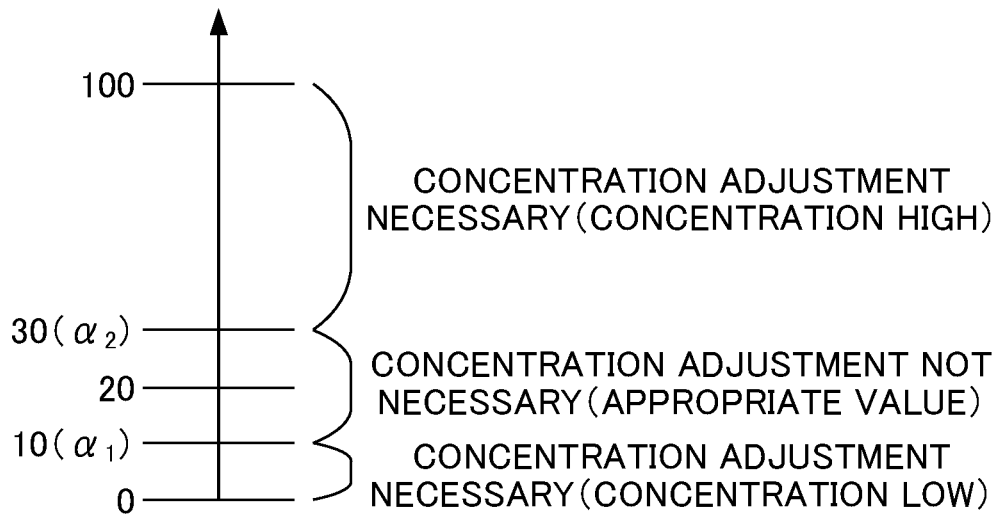
FIG. 3 is a diagram illustrating an example of a concentration of a cutting fluid.

FIG. 3 is a diagram illustrating an example of a concentration of a cutting fluid. As illustrated in FIG. 3, for example, even if the cutting fluid is stored in the tank 30 with a concentration of "20%" as an initial value, the concentration changes due to evaporation or mixing of chips or the like. For example, when the concentration has an appropriate value in the range from "10%" to "30%", the cutting fluid functions properly. On the other hand, when the concentration is outside the range of the appropriate values, the cutting fluid does not function properly. In this case, an operator needs to adjust the concentration of the cutting fluid so that the concentration of the cutting fluid has an appropriate value.

In the following description, the concentration of "10%" will be referred to as a lower-limit threshold $\alpha_1$, and the concentration of "30%" will be referred to as an upper-limit threshold $\alpha_2$. The thresholds $\alpha_1$ and $\alpha_2$ may be set appropriately according to the material of the machining target work and the environment or the like in which the machine tool 20 and the tank 30 are provided.

The determination unit 403 determines whether the concentration predicted by the prediction unit 402 has an appropriate value in the range between the lower-limit threshold $\alpha_1$ and the upper-limit threshold $\alpha_2$. When the predicted concentration has an appropriate value, the determination unit 403 determines that concentration adjustment maintenance of the cutting fluid is not to be performed before machining is performed under the machining conditions input by the input unit 401.

On the other hand, when the predicted concentration is lower than the lower-limit threshold $\alpha_1$, the determination unit 403 determines a timing before machining is performed under the input machining conditions as a timing to perform concentration adjustment maintenance of increasing the concentration by adding an undiluted solution or the like of the cutting fluid, for example. Moreover, when the predicted concentration is higher than the upper-limit threshold $\alpha_2$, the determination unit 403 determines a timing before machining is performed under the input machining conditions as a timing to perform concentration adjustment maintenance of decreasing the concentration by adding water or the like, for example.

The notification unit 404 may output an instruction for the determined concentration adjustment maintenance to an output device (not illustrated) such as a liquid crystal display included in the controller 10 and/or the machine tool 20.

Maintenance of pH Value

Figure 4:
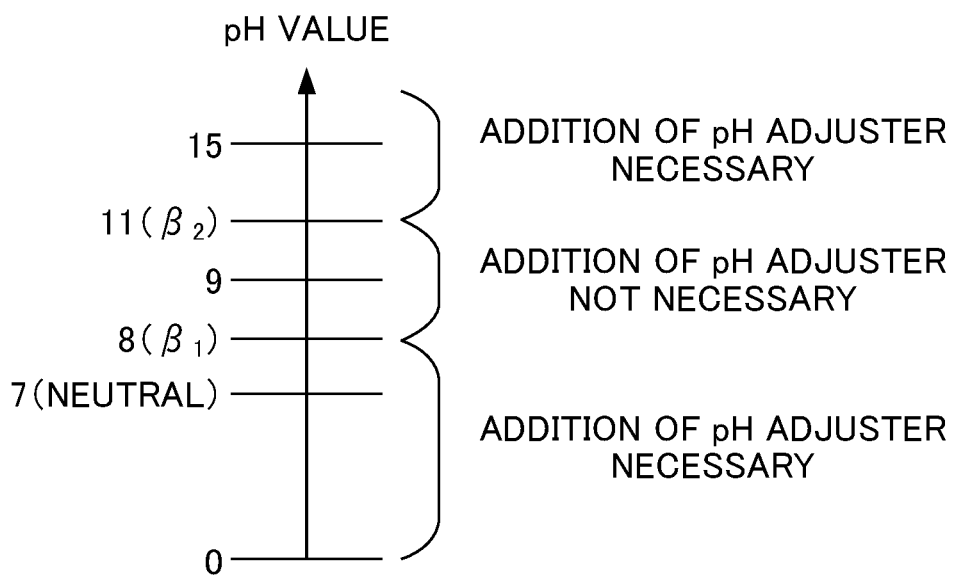
FIG. 4 is a diagram illustrating an example of a pH value of a cutting fluid.

FIG. 4 is a diagram illustrating an example of a pH value of a cutting fluid. As illustrated in FIG. 4, for example, even if the cutting fluid is stored in the tank 30 with a pH value of "9" in an alkaline state as an initial value, the pH value changes due to evaporation or mixing of chips or the like. For example, when the pH value is an appropriate value in the range from "8" to "11", the cutting fluid functions properly. On the other hand, when the pH value is outside the range of the appropriate values, the cutting fluid does not function properly. In this case, an operator needs to adjust the pH value of the cutting fluid so that the pH value of the cutting fluid is an appropriate value.

In the following description, the pH value of "8" will be referred to as a lower-limit threshold $\beta_1$, and the pH value of "11" will be referred to as an upper-limit threshold $\beta_2$. The thresholds $\beta_1$ and $\beta_2$ may be set appropriately according to the material of the machining target work and the environment or the like in which the machine tool 20 and the tank 30 are provided.

The determination unit 403 determines whether the pH value predicted by the prediction unit 402 is an appropriate value in the range between the lower-limit threshold $\beta_1$ and the upper-limit threshold $\beta_2$. When the predicted pH value is an appropriate value, the determination unit 403 determines that pH adjustment maintenance of the cutting fluid is not to be performed before machining is performed under the machining conditions input by the input unit 401.

On the other hand, when the predicted pH value is lower than the lower-limit threshold $\beta_1$, the determination unit 403 determines a timing before machining is performed under the input machining conditions as a timing to perform pH adjustment maintenance of increasing the pH value by adding a pH adjuster, for example. Moreover, when the predicted pH value is higher than the upper-limit threshold $\beta_2$, the determination unit 403 determines a timing before machining is performed under the input machining conditions as a timing to perform pH adjustment maintenance of decreasing the pH value by adding a pH adjuster, for example.

When the predicted pH value is lower than the lower-limit threshold $\beta_1$ and is near the neutral state of the pH value of "7", there is a possibility that microorganisms such as bacteria are generated. Therefore, the determination unit 403 may determine a timing before machining is performed under the input machining conditions as a timing to perform maintenance of adding disinfectants or the like together with a pH adjuster.

The notification unit 404 may output an instruction for the determined pH adjustment maintenance to an output device (not illustrated) such as a liquid crystal display included in the controller 10 and/or the machine tool 20.

Maintenance of Odor Level

Figure 5:
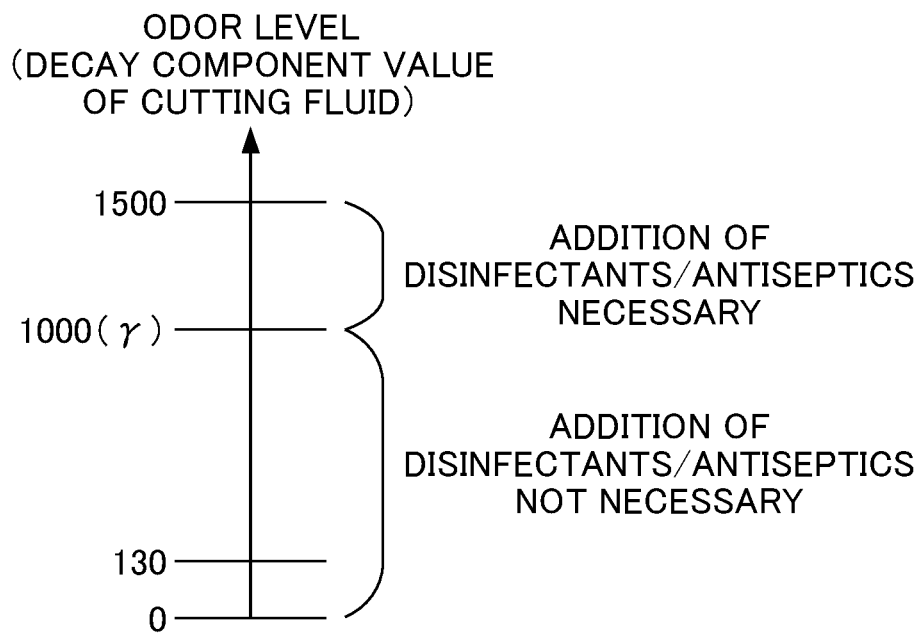
FIG. 5 is a diagram illustrating an example of an odor level of a cutting fluid.

FIG. 5 is a diagram illustrating an example of an odor level of a cutting fluid. As illustrated in FIG. 5, for example, even if the cutting fluid is stored in the tank 30 with an odor level of "130" as an initial value, the odor level changes due to evaporation or mixing of chips or the like and the occurrence of microorganisms such as bacteria. For example, when the main cause of odor is the occurrence of microorganisms, microorganisms are rarely generated in the cutting fluid if the odor level has an appropriate value smaller than "1000", and a large amount of microorganisms are generated if the odor level "1000" or more. In this case, an operator needs to adjust the odor level of the cutting fluid so that the odor level of the cutting fluid is equal to or smaller than the appropriate value.

In the following description, the odor level of "1000" is referred to as a threshold $\gamma$. The threshold $\gamma$ may be set appropriately according to the environment or the like in which the machine tool 20 and the tank 30 are provided.

The determination unit 403 determines whether the odor level predicted by the prediction unit 402 has an appropriate value smaller than the threshold $\gamma$. When the predicted odor level has an appropriate value smaller than the threshold $\gamma$, the determination unit 403 determines that maintenance of adjusting the odor level of the cutting fluid is not to be performed before machining is performed under the machining conditions input by the input unit 401.

On the other hand, when the predicted odor level is equal to or larger than the threshold $\gamma$, the determination unit 403 determines a timing before machining is performed under the input machining conditions as a timing to perform maintenance of decreasing the odor level by adding disinfectants and/or antiseptics, for example.

The notification unit 404 may output an instruction for the determined odor level maintenance to an output device (not illustrated) such as a liquid crystal display included in the controller 10 and/or the machine tool 20.

Evaluation Value

As described above, the determination unit 403 calculates an evaluation value E by weight-adding the predicted values of the concentration, the pH value, and the odor level of the cutting fluid predicted by the prediction unit 402 using Equation (1), for example. $\varepsilon_1$, $\varepsilon_2$, and $\varepsilon_3$ are weighting coefficients.

$$E = \varepsilon_1 \times (\text{concentration}) + \varepsilon_2 \times (\text{pH value}) + \varepsilon_3 \times (\text{odor level}) \quad (1)$$

Figure 6:
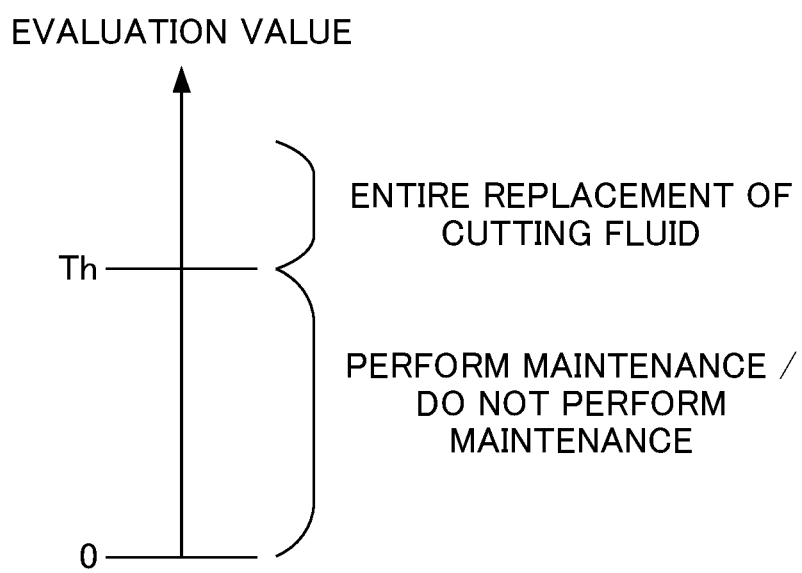
FIG. 6 is a diagram illustrating an example of an evaluation value.

FIG. 6 is a diagram illustrating an example of the evaluation value E. For example, when the evaluation value E is smaller than a threshold Th set in advance and all predicted values of the concentration, the pH value, and the odor level of the cutting fluid are appropriate values, the determination unit 403 determines that maintenance of adjusting the concentration, the pH value, and the odor level of the cutting fluid is not to be performed. On the other hand, when the evaluation value E is smaller than the threshold Th and the predicted value of any one of the concentration, the pH value, and the odor level of the cutting fluid is not an appropriate value, the determination unit 403 determines a timing before machining is performed under the input machining conditions as a timing to perform maintenance of adjusting the concentration, the pH value, or the odor level of the cutting fluid of which the predicted value is not the appropriate value.

Moreover, when the evaluation value E is equal to or larger than the threshold Th, the determination unit 403 determines a timing before machining is performed under the input machining conditions as a timing to replace the cutting fluid entirely.

The notification unit 404 may output an instruction for the determined maintenance or entire replacement of the cutting fluid to an output device (not illustrated) such as a liquid crystal display included in the controller 10 and/or the machine tool 20.

The storage unit 405 is a ROM, an HDD, or the like and may store the learned model 450 together with various control programs.

Prediction Process of Prediction Device 40 in Operation Phase

Next, an operation related to a prediction process of the prediction device 40 according to the present embodiment will described.

Figure 7:
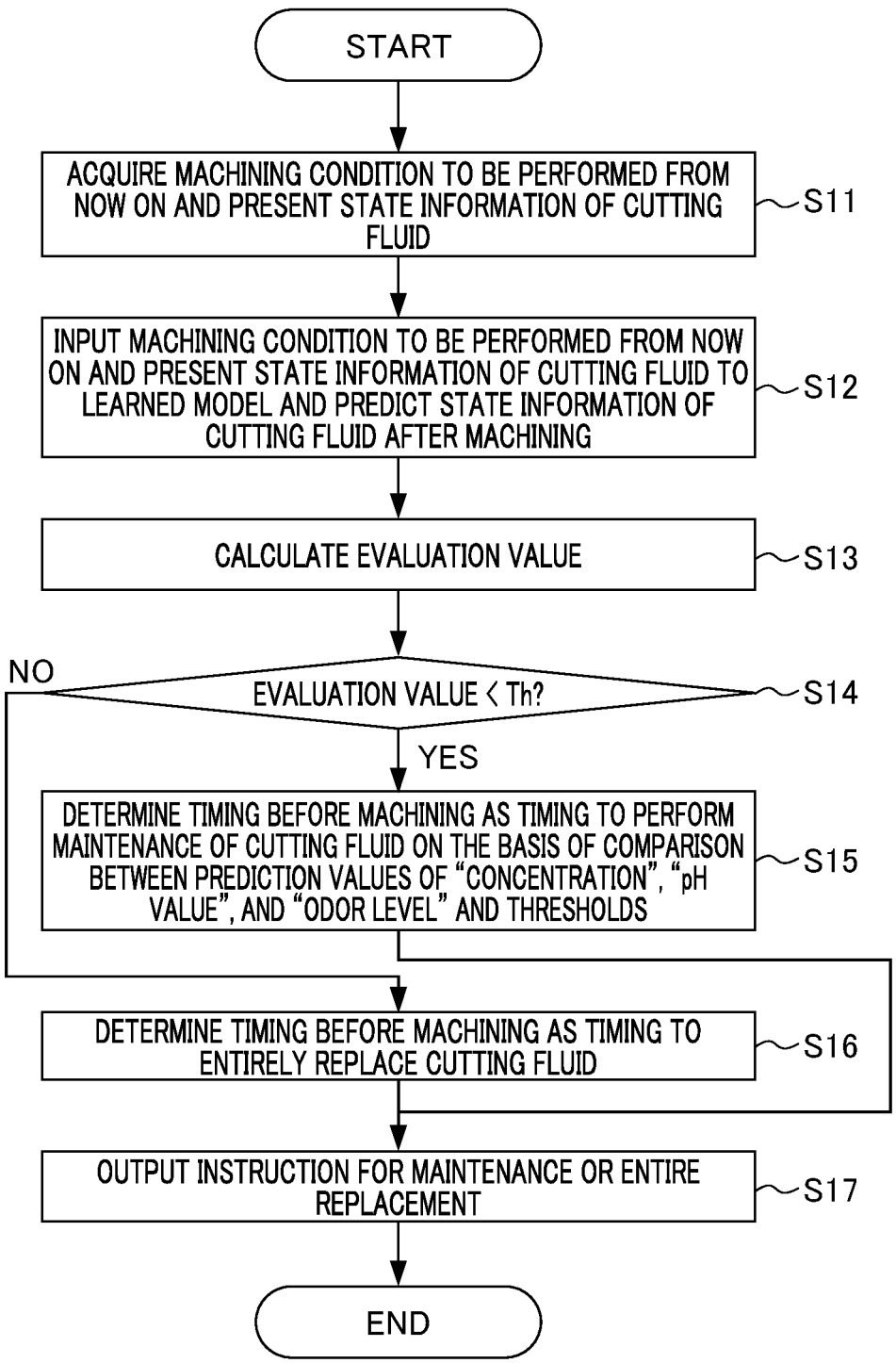
FIG. 7 is a flowchart describing a prediction process of a prediction device in an operation phase.

FIG. 7 is a flowchart describing a prediction process of the prediction device 40 in an operation phase.

In step S11, the input unit 401 acquires the machining conditions to be performed from now on with respect to the machining target work from the control information of the controller 10 prior to machining by the machine tool 20 and inputs the present state information of the concentration, the pH value, and the odor level of the cutting fluid.

In step S12, the prediction unit 402 inputs the machining conditions to be performed from now on and the state information of the cutting fluid acquired in step S11 to the learned model 450 and predicts the state information of the concentration, the pH value, and the odor level of the cutting fluid after machining.

In step S13, the determination unit 403 calculates the evaluation value E using the predicted values of the concentration, the pH value, and the odor level of the cutting fluid after machining predicted in step S12 and Equation (1).

In step S14, the determination unit 403 determines whether the evaluation value E calculated in step S14 is smaller than the threshold Th. The flow proceeds to step S15 when the evaluation value E is smaller than the threshold Th, and the flow proceeds to step S16 when the evaluation value E is equal to or larger than the threshold Th.

In step S15, the determination unit 403 determines a timing before machining as a timing to perform maintenance of the cutting fluid on the basis of a comparison between the predicted values of the concentration, the pH value, and the odor level of the cutting fluid after machining predicted in step S12 and the thresholds.

In step S16, the determination unit 403 determines a timing before machining as a timing to replace the cutting fluid entirely.

In step S17, the notification unit 404 outputs an instruction for the maintenance or the entire replacement determined in step S15 or S16.

In this way, the predict on device 40 according to the embodiment inputs the machining conditions to be performed from now on with respect to the machining target work related to the machining and the present state information including the concentration, the pH value, and the odor level of the cutting fluid to the learned model 450 prior to machining by the machine tool 20 and predicts the state information of the concentration, the pH value, and the odor level of the cutting fluid after machining. The prediction device 40 can detect whether maintenance of the cutting fluid or entire replacement of the cutting fluid is necessary in advance during machining on the basis of a comparison between the predicted values or the evaluation values E of the concentration, the pH value, and the odor level of the cutting fluid after machining and the thresholds.

That is, the prediction device 40 can detect a timing before machining is performed under the machining conditions to be performed from now on as an optimal timing to perform maintenance of the cutting fluid or replace the cutting fluid entirely.

In this way, the numerical control system can manage the production schedule by taking the timing to perform maintenance of the cutting fluid or replace the cutting fluid into consideration. Moreover, the numerical control system can avoid a decrease in tool life and machining accuracy resulting from machining in a state where the effect of the cutting fluid is degraded.

Particularly, in a plant where the same machining is performed on a plurality of works or a plant having a central management tank in which one tank 30 is shared by a plurality of machine tools 20, by managing the production schedule by taking the timing to perform maintenance of the cutting fluid or replace the cutting fluid into consideration, it is possible to avoid a decrease in tool life and machining accuracy resulting from machining in a state where the effect of the cutting fluid is degraded.

Moreover, since the prediction device 40 can determine whether a problem can be solved by maintenance of the cutting fluid or it is necessary to replace the cutting fluid entirely, it is possible to save the cost of needlessly treating waste cutting fluid and the cost of purchasing new cutting fluid.

Moreover, since the prediction device 40 uses the learned model 450, an operator does not need to determine whether maintenance of the cutting fluid or replacement of the cutting fluid is necessary, and the burden on the operator can be alleviated.

While an embodiment has been described, the prediction device 40 and the machine learning device 50 are not limited to the above-described embodiment and modifications, improvements, and the like can be made within a range where the object can be attained.

Modification 1

In the above-described embodiment, although the machine learning device 50 is illustrated as a device different from the controller 10, the machine tool 20, and the prediction device 40, some or all functions of the machine learning device 50 may be included in the controller 10, the machine tool 20, or the prediction device 40.

Modification 2

For example, in the above-described embodiment, although the prediction device 40 is illustrated as a device different from the controller 10 and the machine tool 20, some or all functions of the prediction device 40 may be included in the controller 10 or the machine tool 20.

Alternatively, some or all of the input unit 401, the prediction unit 402, the determination unit 403, the notification unit 404, and the storage unit 405 can be included in a server, for example. Moreover, the functions of the prediction device 40 may be realized using a virtual server function or the like on the cloud.

Furthermore, the prediction device 40 may be a distributed processing system in which the functions of the prediction device 40 are distributed appropriately to a plurality of servers.

Modification 3

For example, in the above-described embodiment, although the determination unit 403 of the prediction device 40 determines a timing before machining as a timing to perform maintenance of the cutting fluid or replace the cutting fluid on the basis of a comparison between the predicted values or the evaluation values E of the concentration, the pH value, and the odor level of the cutting fluid after machining and the thresholds, there is no limitation thereto.

For example, when a plurality of (for example, ten) works to be machined are included in the machining conditions, the determination unit 403 may adjust the number of works to be machined so that, the predicted values of the concentration, the pH value, and the odor level of the cutting fluid after machining maintain the appropriate values or the evaluation value F does not exceed the threshold Th.

More specifically, for example, when a plurality of works are machined under the machining conditions to be performed from now on and the predicted value of any one of the concentration, the pH value, and the odor level of the cutting fluid after machining deviates from an appropriate value or the evaluation value E exceeds the threshold Th, the determination unit 403 may cause the prediction unit 402 to predict the concentration, the pH value, and the odor level of the cutting fluid after machining while decreasing the "number of works to be machined" in the machining conditions by one (according to an instruction of the operator) to search for the number k (for example, six) of works that allows the predicted value to be maintained at the appropriate value or the evaluation value to not exceed the threshold Th. Here, k is an integer of 1 or more.

The determination unit 403 determines a timing after machining is performed on k works, for example, as a timing to perform maintenance of the cutting fluid or replace the entire cutting fluid. In this way, the numerical control system illustrated in FIG. 1 can stop the machine tool and perform maintenance of the cutting fluid or replace the cutting fluid entirely at an appropriate time to pause, which is the determined timing.

In this way, the numerical control system can predict the timing at which maintenance of the cutting fluid or entire replacement of the cutting fluid becomes necessary in relation to how much machining is performed before the machining starts. The numerical control system can avoid the occurrence of a necessity to perform maintenance of the cutting fluid or replace the cutting fluid entirely during machining and avoid a decrease in machining quality.

Modification 4

Figure 8:
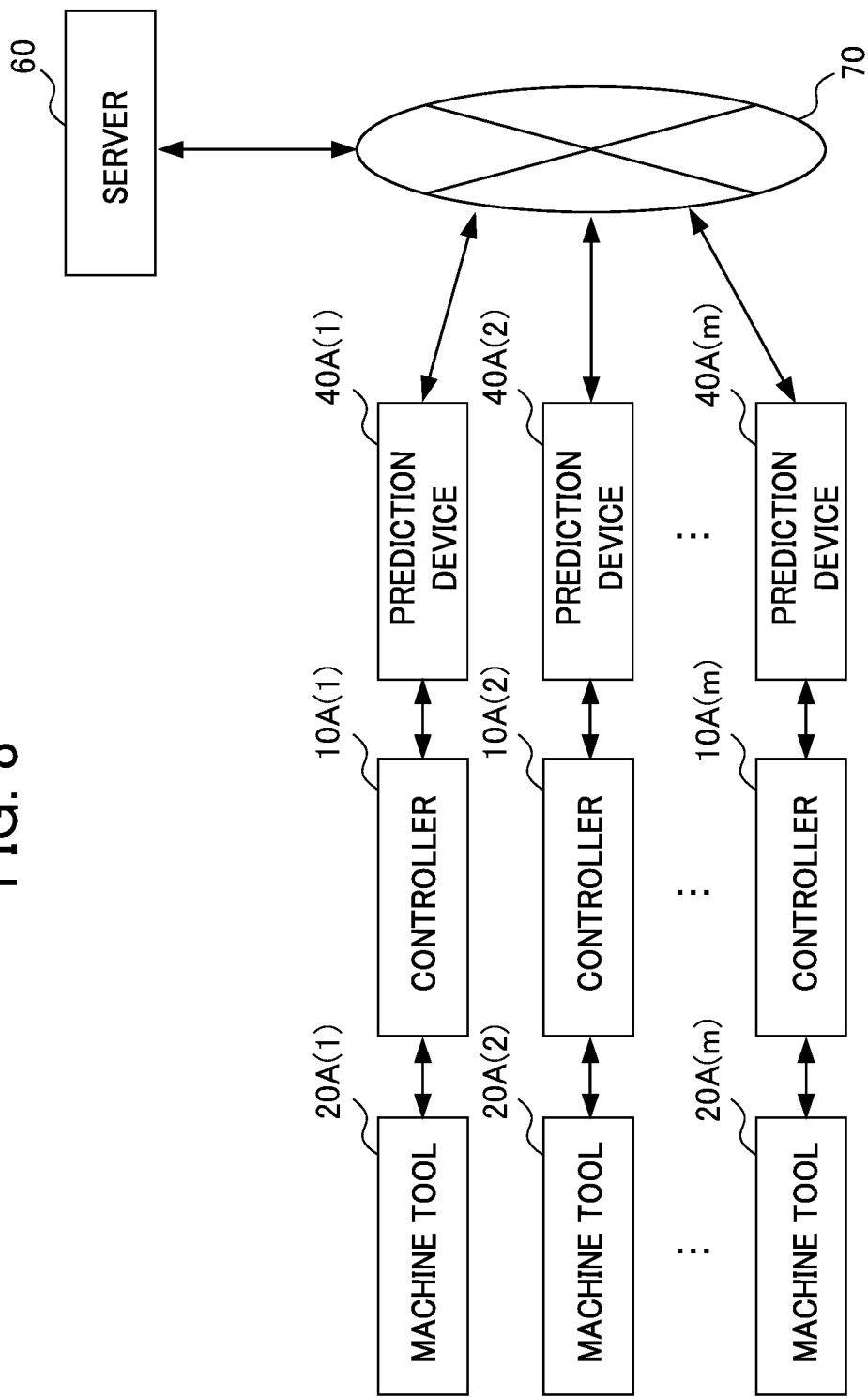
FIG. 8 is a diagram illustrating an example of a configuration of a numerical control system.

For example, in the above-described embodiment, although the prediction device 40 estimates the concentration, the pH value, and the odor level of the cutting fluid after machining is performed under the machining conditions to be performed from now on acquired from one controller 10 using the learned model 450 provided from the machine learning device 50, there is no limitation thereto. For example, as illustrated in FIG. 8, the server 60 may store the learned model 450 generated by the machine learning device 50 and share the learned model 450 with m prediction devices 40A(1) to 40A(m) (m is an integer of 2 or more) connected to the network 70. In this way, even when a new machine tool, a new controller, and a new prediction device are disposed, it is possible to apply the learned model 450.

The prediction device 40A(1) to 40A(m) are connected to the controllers 10A(1) to 10A(m), respectively, and the controllers 10A(1) to 10A(m) are connected to the machine tools 20A(1) to 20A(m), respectively.

Moreover, the controllers 10A(1) to 10A(m) each correspond to the controller 10 in FIG. 1. The machine tools 20A(1) to 20A (m) each correspond to the machine tool 20 in FIG. 1. The prediction devices 40A(1) to 40A(m) each correspond to the prediction device 40 in FIG. 1.

Figure 9:
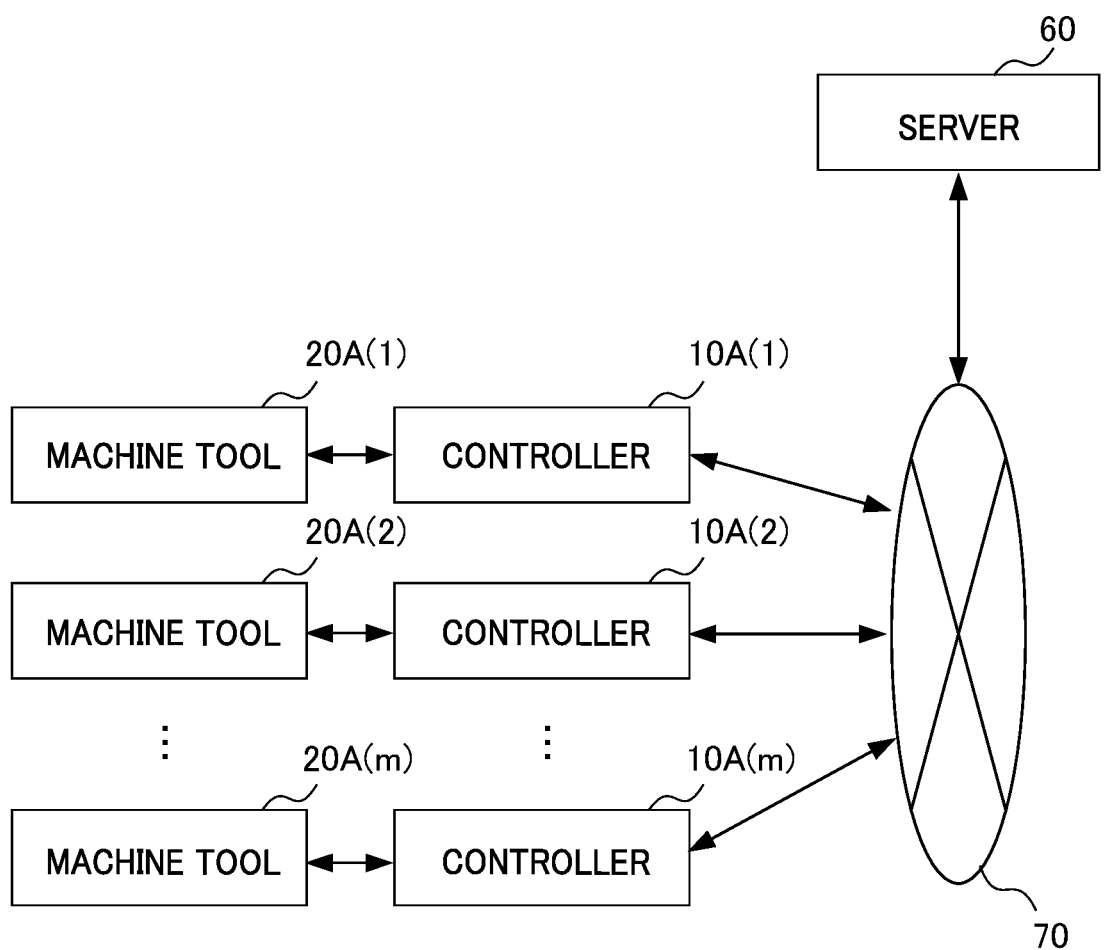
FIG. 9 is a diagram illustrating an example of a configuration of a numerical control system.

Alternatively, as illustrated in FIG. 9, the server 60 may operate as the prediction device 40, for example, and may estimate the concentration, the pH value, and the odor level of the cutting fluid after machining is performed based on the machining conditions to be performed from now on with respect to each of the controllers 10A(1) to 10A(m) connected to the network 70. In this way, even when a new machine tool and a new controller are disposed, it is possible to apply the learned model 450.

The functions included in the prediction device 40 and the machine learning device 50 of the embodiment may be realized by hardware, software, or a combination thereof. Here, being realized by software means being realized by a computer reading and executing a program.

The programs can be stored on any of various types of non-transitory computer readable media and be provided to a computer. The non-transitory computer readable media include various types of tangible storage media. Examples of the non-transitory computer readable media include a magnetic recording medium (for example, a flexible disk, a magnetic tape, and a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM). The programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber, or the like or a wireless communication path.

A step of describing programs to be recorded on a recording medium includes processing that is performed in a time series manner according to the order and processing that is performed in a parallel or independent manner even if the processing is not necessarily performed in a time series manner.

In other words, the machine learning device, the prediction device, and the controller of the present disclosure can have various embodiments having the following configurations.

(1) A machine learning device 50 according to the present disclosure includes: an input data acquisition unit 501 that acquires input data including arbitrary machining conditions for an arbitrary work in the machining of an arbitrary machine tool and state information indicating a state of a cutting fluid before machining is performed under the machining conditions; a label acquisition unit 502 that acquires label data indicating state information of the cutting fluid after the machining is performed under the machining conditions included in the input data; and a learning unit 503 that executes supervised learning using the input data acquired by the input data acquisition unit 501 and the label data acquired by the label acquisition unit 502, and generates a learned model 450.

According to the machine learning device 50, it is possible to generate the learned model 450 that predicts the state of a cutting fluid after machining.

(2) The machining conditions may include at least the number of works to be machined, and the state information may include at least a concentration, a pH value, and an odor level of the cutting fluid.

By doing so, it is possible to avoid the occurrence of a necessity to perform maintenance of the cutting fluid or replace the cutting fluid entirely during machining.

(3) A prediction device 40 according to the present disclosure includes: the learned model 450 generated by the machine learning device 50; an input unit 401 that inputs machining conditions to be performed from now on with respect to a machining target work and present state information of a cutting fluid prior to machining by the machine tool 20; a prediction unit 402 that inputs the machining conditions to be performed from now on and the present state information input by the input unit 401 to the learned model 450 and predicts state information of the cutting fluid after machining is performed under the machining conditions to be performed from now on.

According to the prediction device 40, it is possible to predict the state of the cutting fluid after machining.

(4) The prediction device may further include a determination unit 403 that determines a timing to perform maintenance of the cutting fluid on the basis of a comparison between any one of the predicted values included in the state information of the cutting fluid predicted by the prediction unit 402 and a threshold set in advance.

By doing so, the prediction device 40 can avoid the occurrence of a necessity to perform maintenance during machining and avoid a decrease in machining quality.

(5) When any one of the predicted values included in the state information of the cutting fluid is not an appropriate value, the determination unit 403 may change the machining conditions so that all predicted values included in the state information of the cutting fluid have appropriate values.

By doing so, it is possible to predict a timing at which maintenance of the cutting fluid becomes necessary in relation to how much machining is performed before the machining starts.

(6) The prediction device may further include a determination unit 403 that calculates an evaluation value E by weight-adding predicted values included in the state information of the cutting fluid predicted by the prediction unit 402 and determines a timing to entirely replace the cutting fluid on the basis of a comparison between the calculated evaluation value E and a threshold set in advance.

By doing so, the prediction device 40 can avoid the occurrence of a necessity to replace the cutting fluid entirely during machining and avoid a decrease in machining quality.

(7) The prediction device may further include a determination unit 403 that calculates an evaluation value E by weight-adding predicted values included in the state information of the cutting fluid predicted by the prediction unit 402 and determines a timing to perform maintenance of the cutting fluid or a timing to entirely replace the cutting fluid on the basis of a comparison between the calculated evaluation value E and a threshold set in advance.

By doing so, the prediction device 40 can avoid the occurrence of a necessity to perform maintenance of the cutting fluid or replace the cutting fluid entirely during machining and avoid a decrease in machining quality.

(8) When the evaluation value E is equal to or larger than the threshold, the determination unit 403 may change the machining conditions so that the evaluation value E is smaller than the threshold.

By doing so, it is possible to predict a timing at which replacement of the cutting fluid in its entirety becomes necessary in relation to how much machining is performed before the machining starts.

(9) The determination unit 403 may adjust the number of works included in the machining conditions.

By doing so, it is possible to stop the machine tool 20 and set a schedule for maintenance of the cutting fluid or entire replacement of the cutting fluid at a stage when it is an appropriate time to pause the machining.

(10) The learned model 450 may be provided in a server 60 connected so as to be accessible from the prediction device 40 via a network 70.

By doing so, even when a new controller 10, a new machine tool 20, and a new prediction device 40 are disposed, it is possible to apply the learned model 450.

(11) The prediction device may include the machine learning device 50.

By doing so, it is possible to obtain advantages similar to those of any one of (1) to (10).

(12) A controller 10 according to the present disclosure may include the prediction device 40.

According to the controller 10, it is possible to obtain advantages similar to those of any one of (1) to (11).

EXPLANATION OF REFERENCE NUMERALS

10: Controller
20: Machine tool
30: Tank
40: Prediction device
50: Machine learning device
401: Input unit
402: Prediction unit
403: Determination unit
440: Learned model
501: input data acquisition unit
502: Label acquisition unit
503: Learning unit

What is claimed is:

1. A machine learning device comprising:
an input data acquisition unit that acquires input data including arbitrary machining conditions for an arbitrary work in machining by an arbitrary machine tool and state information indicating a state of a cutting fluid before machining is performed under the machining conditions, the machining conditions including at least a machining time, a machining type, a size of the work, a number of works to be machined, a material, and a tool type;
a label acquisition unit that acquires label data indicating state information of the cutting fluid after the machining is performed under the machining conditions included in the input data;
a learning unit that executes supervised learning using the input data acquired by the input data acquisition unit and the label data acquired by the label acquisition unit, and generates a learned model which predicts state information of the cutting fluid after machining;
an input unit that inputs machining conditions to be performed from now on with respect to a machining target work and present state information of the cutting fluid prior to machining by the machine tool;
a prediction unit that inputs the machining conditions to be performed from now on and the present state information input by the input unit to the learned model and predicts the state information of the cutting fluid after machining is performed under the machining conditions to be performed from now on; and
a determination unit that (i) calculates an evaluation value by multiplying each of a plurality of weighting coefficients by a corresponding one of a plurality of predicted values included in the state information of the cutting fluid predicted by the prediction unit to obtain a plurality of weighted predicted values, and adding the plurality of weighted predicted values, and (ii) determines a timing to entirely replace the cutting fluid on the basis of a comparison between the calculated evaluation value and a threshold set in advance.

2. The machine learning device according to claim 1, wherein
the state information includes at least a concentration, a pH value, and an odor level of the cutting fluid.

3. A prediction device comprising:
a storage unit that stores a learned model, which predicts state information of a cutting fluid after machining, generated by a machine learning device, the machine learning device including:
an input data acquisition unit that acquires input data including arbitrary machining conditions for an arbitrary work in machining by an arbitrary machine tool and state information indicating a state of the cutting fluid before machining is performed under the machining conditions, the machining conditions including at least a machining time, a machining type, a size of the work, a number of works to be machined, a material, and a tool type;
a label acquisition unit that acquires label data indicating state information of the cutting fluid after the machining is performed under the machining conditions included in the input data; and
a learning unit that executes supervised learning using the input data acquired by the input data acquisition unit and the label data acquired by the label acquisition unit, and generates the learned model which predicts state information of the cutting fluid after machining;
an input unit that inputs machining conditions to be performed from now on with respect to a machining target work and present state information of the cutting fluid prior to machining by the machine tool;
a prediction unit that inputs the machining conditions to be performed from now on and the present state information input by the input unit to the learned model and predicts the state information of the cutting fluid after machining is performed under the machining conditions to be performed from now on; and
a determination unit that (i) calculates an evaluation value by multiplying each of a plurality of weighting coefficients by a corresponding one of a plurality of predicted values included in the state information of the cutting fluid predicted by the prediction unit to obtain a plurality of weighted predicted values, and adding the plurality of weighted predicted values, and (ii) determines a timing to entirely replace the cutting fluid on the basis of a comparison between the calculated evaluation value and a threshold set in advance.

4. The prediction device according to claim 3, wherein the determination unit determines a timing to perform maintenance of the cutting fluid on the basis of a comparison between any one of the plurality of predicted values included in the state information of the cutting fluid predicted by the prediction unit and a threshold set in advance for each of the predicted values.

5. The prediction device according to claim 4, wherein when any one of the predicted values included in the state information of the cutting fluid exceeds a corresponding threshold value, the determination unit determines an adjustment amount for the number of works to be machined included in the machining conditions such that each of the predicted values included in the state information of the cutting fluid does not exceed the corresponding threshold value.

6. The prediction device according to claim 3, wherein when the evaluation value is equal to or larger than the threshold, the determination unit determines a manner in which the machining conditions are to be changed so that the evaluation value is smaller than the threshold.

7. The prediction device according to claim 3, wherein the learned model is provided in a server connected so as to be accessible from the prediction device via a network.

8. The prediction device according to claim 3, wherein the machine learning device is incorporated in the prediction device.

9. The prediction device according to claim 3, wherein the prediction device is incorporated in a controller.

10. The prediction device according to claim 3, wherein the state information includes at least a concentration, a pH value, and an odor level of the cutting fluid.

11. A machine learning device comprising:
an input data acquisition unit that acquires input data including arbitrary machining conditions for an arbitrary work in machining by an arbitrary machine tool and state information indicating a state of a cutting fluid before machining is performed under the machining conditions, the machining conditions including at least a machining time, a machining type, a size of the work, a number of works to be machined, a material, and a tool type;
a label acquisition unit that acquires label data indicating state information of the cutting fluid after the machining is performed under the machining conditions included in the input data;
a learning unit that executes supervised learning using the input data acquired by the input data acquisition unit and the label data acquired by the label acquisition unit, and generates a learned model which predicts state information of the cutting fluid after machining;
an input unit that inputs machining conditions to be performed from now on with respect to a machining target work and present state information of the cutting fluid prior to machining by the machine tool;
a prediction unit that inputs the machining conditions to be performed from now on and the present state information input by the input unit to the learned model and predicts the state information of the cutting fluid after machining is performed under the machining conditions to be performed from now on; and
a determination unit that (i) calculates an evaluation value by multiplying each of a plurality of weighting coefficients by a corresponding one of a plurality of predicted values included in the state information of the cutting fluid predicted by the prediction unit to obtain a plurality of weighted predicted values, and adding the plurality of weighted predicted values, and (ii) determines a timing to perform maintenance of the cutting fluid or a timing to entirely replace the cutting fluid on the basis of a comparison between the calculated evaluation value and a threshold set in advance.

12. A prediction device comprising:
a storage unit that stores a learned model, which predicts state information of a cutting fluid after machining, generated by a machine learning device, the machine learning device including:
an input data acquisition unit that acquires input data including arbitrary machining conditions for an arbitrary work in machining by an arbitrary machine tool and state information indicating a state of the cutting fluid before machining is performed under the machining conditions, the machining conditions including at least a machining time, a machining type, a size of the work, a number of works to be machined, a material, and a tool type;
a label acquisition unit that acquires label data indicating state information of the cutting fluid after the machining is performed under the machining conditions included in the input data; and
a learning unit that executes supervised learning using the input data acquired by the input data acquisition unit and the label data acquired by the label acquisition unit, and generates the learned model which predicts state information of the cutting fluid after machining;
an input unit that inputs machining conditions to be performed from now on with respect to a machining target work and present state information of the cutting fluid prior to machining by the machine tool;
a prediction unit that inputs the machining conditions to be performed from now on and the present state information input by the input unit to the learned model and predicts the state information of the cutting fluid after machining is performed under the machining conditions to be performed from now on; and
a determination unit that (i) calculates an evaluation value by multiplying each of a plurality of weighting coefficients by a corresponding one of a plurality of predicted values included in the state information of the cutting fluid predicted by the prediction unit to obtain a plurality of weighted predicted values, and adding the plurality of weighted predicted values, and (ii) determines a timing to perform maintenance of the cutting fluid or a timing to entirely replace the cutting fluid on the basis of a comparison between the calculated evaluation value and a threshold set in advance.

* * * * *